United States Patent Office 3,111,374
Patented Nov. 19, 1963

3,111,374
RECOVERY OF ACTINIDES FROM AQUEOUS NITRIC ACID SOLUTIONS
Milton Ader, Park Forest, Ill., assignor to the United States of America as represented by the United States Atomic Energy Commission
No Drawing. Filed Aug. 20, 1954, Ser. No. 451,315
4 Claims. (Cl. 23—14.5)

This invention deals with a process of treating aqueous solutions containing nitrates of tetravalent actinides, such as plutonium and thorium, and in particular with the solvent extraction of such solutions with a ketone, the back-extraction of the actinides from the extracts obtained and the concentration of the final aqueous "strip solution."

Actinides, such as plutonium and thorium, are often recovered in the form of dilute aqueous nitric acid solutions of their nitrates in association with the nitrates of other metal values, e.g. of rare earth metal values. The actinides, in one of the most customary procedures, are isolated by extraction with a water-immiscible ketone and thereafter back-extracted from the ketone with an aqueous medium. The actinide nitrate solutions thus obtained are mostly very dilute, and a concentration step by boiling is therefore applied. Actinide recovery by extraction is the subject matter of application Serial No. 318,072, filed on October 31, 1952, by Seaborg et al., now U.S. Patent No. 2,950,166, granted on August 23, 1960.

It has been found that during heating of these aqueous nitrate solutions an actinide-containing precipitate forms which represents a very undesirable side-reaction. This phenomenon was encountered particularly when the solution was saturated with, or very concentrated in, the ketone, a condition which is mostly prevalent in such aqueous strip solutions. In the case of most ketones, e.g. of hexone (methyl isobutyl ketone), one of the preferred ketone extractants, a saturated solution averages about 20 grams of ketone per liter.

It is an object of this invention to provide a process for treating aqueous solutions containing tetravalent actinide nitrates and an organic ketone by which the formation of a precipitate during heating is prevented.

Another object of this invention is to provide a process for treating aqueous solutions containing tetravalent actinide nitrates and an organic ketone by which the formation of a precipitate during heating is prevented without the necessity of adding any foreign ions to the solution.

It has been found that, although heating of an aqueous ketone-containing strip solution as described above causes precipitation of at least part of the tetravalent actinide, no precipitation occurs if the heating step is carried out while the solution is sparged with steam. It has furthermore been found that, if the ketone concentration is as low as 3 grams per liter or less, no precipitation of the actinide metal takes place.

The process of this invention thus comprises contacting an aqueous nitric acid solution containing a nitrate of a tetravalent actinide element with a substantially water-immiscible ketone whereby the nitrate is taken up by the ketone; separating the ketone extract from the aqueous solution; contacting the ketone extract with an aqueous medium whereby the actinide nitrate and some of the ketone are reextracted into an aqueous strip solution; separating the strip solution from an organic raffinate; sparging the strip solution with steam until the ketone content of said strip solution has been reduced to at most 3 grams per liter; and boiling the strip solution to concentrate it.

For the sparging step steam was found to be extremely efficient and rapid, since 99.9% of the dissolved hexone, or other ketone, could be eliminated in twenty minutes.

The following data show the function between degree of removal of hexone by steam sparging and time of sparging:

| Sparging time, minutes: | Hexone removed, Percent |
|---|---|
| 10 | 92.5 |
| 15 | 99.7 |
| 20 | 99.9 |

*Example*

An aqueous feed solution 1.3 M in aluminum nitrate, 0.36 M in nitric acid and containing about 0.5 gram $Pu^{IV}$ per liter and fission products having a radioactivity of $1.296 \times 10^{-4}$ gross gamma and $1.256 \times 10^{-4}$ curies per gallon gross beta was countercurrently contacted in an extraction column with hexone 0.5 M in $HNO_3$. The solvent extract obtained thereby was then scrubbed with an aqueous scrub solution, namely, a 1.30 M aluminum nitrate solution. The feed was introduced at about the center of the column, the hexone near the bottom and the scrub solution near the top; the flow ratio was 4:7:4, respectively. The scrubbed hexone extract phase was withdrawn at the top of the column and introduced into a second column for reextraction of stripping of the plutonium content into an aqueous medium and regeneration of the hexone for reuse. In this column the hexone extract was countercurrently contacted with 0.1 M nitric acid which was introduced near the top of the stripping column while hexone extract was introduced near the bottom; the flow ratio for nitric acid:hexone extract was 16:69. The aqueous strip solution leaving the stripping column contained about 1.3 grams of plutonium per liter, nitric acid in a concentration of about 1.1 M, close to 2% by weight of hexone; its boiling point was about 100° C. The beta and gamma fission product contents each had been reduced to about 19% of the feed solution.

The strip solution was then freed of hexone and at the same time concentrated. For this purpose a vertical column was used which was inserted in the top of a 180-gallon tank; the tank was provided for indirect steam heating. The column was about 8.5 feet high, had a 12-inch inside diameter and consisted of two sections, a lower section 4 feet 9 inches high and an upper section 21 inches high; both sections were packed with one-inch stainless steel Raschig rings. Between the two sections a weir-type inlet feed distributor was arranged, and the top of the column was equipped with three spray nozzles for intermittent flushing with demineralized water and for providing liquid reflux if necessary. A sparger which discharged into the top of the tank was connected to a 15-lb. per square inch steam line. A vapor outlet was arranged at the top of the column and connected with a vapor condenser.

Hexone was steam-stripped from the entering plutonium feed solution as it flowed down the packed lower section into the tank. Boiling of demineralized water in the tank supplied the live steam in this instance. (In other runs introduction of live steam through the sparger was also found satisfactory and less time-consuming.) The hexone concentration in this concentrator was reduced to 1 gram per liter.

This solution was then concentrated by indirect steam heating and the boiling rate was at a vapor velocity of 1.7 feet per second, whereby a boil-up rate of 29.5 lbs. per hour per square foot of liquid surface was obtained. The solution obtained thereby was free of any plutonium precipitate, contained about 3.5 grams per liter of plutonium, nitric acid in a concentration of about 2.9 M; it had a boiling point of 102° C.

In other instances steam sparging was carried out to a less complete degree, and the plutonium-containing solution, when then subjected to boiling for concentration, formed a plutonium precipitate.

Solutions treated by the sparging and concentration steps as described in the example can, of course, be subjected to further concentration by boiling; this has been done repeatedly, and in all cases where the hexone content had been brought down to at most 3 grams per liter by the sparging step, precipitation of plutonium did not occur during boiling of the solution.

The process of this invention is applied advantageously for all solutions which contain tetravalent actinide salts and organic ketone and which are to be processed at elevated temperature.

This application is a continuation-in-part of application Serial No. 235,098, filed on July 3, 1951, by Milton Ader.

It will be understood that this invention is not to be limited to the details given herein but that it may be modified within the scope of the appended claims.

What is claimed is:

1. A process of recovering actinide values from an aqueous nitric acid solution containing the nitrate of tetravalent actinide and rare earth metal nitrates, comprising contacting said aqueous solution with a substantially water-immiscible ketone whereby the actinide nitrate is taken up by the ketone and a ketone extract is formed; separating said ketone extract from the aqueous solution; contacting the ketone extract with an aqueous medium whereby the actinide nitrate and some of the ketone are reextracted into said medium and a strip solution is formed; separating said strip solution from an organic raffinate; sparging the strip solution with steam until the ketone content of said strip solution has been reduced to at most 3 grams per liter; and boiling the strip solution to concentrate it.

2. The process of claim 1 wherein the ketone is hexone.

3. A process of recovering plutonium values from an aqueous nitric acid solution containing plutonium (IV) nitrate and fission product nitrates, comprising contacting said aqueous solution with hexone whereby the plutonium nitrate is taken up by the hexone and a hexone extract is formed; separating said hexone extract from the fission products-containing aqueous solution; contacting the hexone extract with nitric acid whereby the plutonium nitrate and some of the hexone are reextracted into said nitric acid and a strip solution is formed; separating said strip solution from an organic raffinate; sparging the strip solution with steam until the hexone content of said strip solution has been reduced to at most 3 grams per liter; and boiling the strip solution to concentrate it.

4. A process of recovering plutonium values from an aqueous nitric acid solution containing plutonium (IV) nitrate and fission product nitrates, comprising contacting said aqueous solution with hexone whereby the plutonium nitrate is taken up by the hexone and a hexone extract is formed; separating said hexone extract from the fission products-containing aqueous solution; contacting the hexone extract with nitric acid whereby the plutonium nitrate and some of the hexone are reextracted into said nitric acid and a strip solution is formed; separating said strip solution from an organic raffinate; removing a portion of the hexone by sparging the strip solution with steam, the remaining portion constituting at most 3 grams per liter; and boiling the strip solution to concentrate it.

References Cited in the file of this patent

UNITED STATES PATENTS

| | | |
|---|---|---|
| 2,208,296 | Lange et al. | July 16, 1940 |
| 2,250,092 | Colgate et al. | July 22, 1941 |